United States Patent
Willis et al.

(10) Patent No.: US 6,332,313 B1
(45) Date of Patent: Dec. 25, 2001

(54) COMBUSTION CHAMBER WITH SEPARATE, VALVED AIR MIXING PASSAGES FOR SEPARATE COMBUSTION ZONES

(75) Inventors: Jeffrey D. Willis, Ernsford Grange; James Melville, Littleover, both of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/574,002

(22) Filed: May 19, 2000

(30) Foreign Application Priority Data

May 22, 1999 (GB) .................................................. 9911867

(51) Int. Cl.⁷ .................................. F02C 9/16; F23R 3/34
(52) U.S. Cl. .......................... 60/39.06; 60/39.23; 60/737; 60/746
(58) Field of Search .............................. 60/39.03, 39.06, 60/39.23, 39.27, 733, 737, 746, 747

(56) References Cited

U.S. PATENT DOCUMENTS

| | | | |
|---|---|---|---|
| 3,986,347 | * 10/1976 | Schirmer | 60/39.23 |
| 4,910,957 | 3/1990 | Moreno . | |
| 4,928,481 | * 5/1990 | Joshi et al. | 60/737 |
| 5,165,241 | * 11/1992 | Joshi et al. | 60/737 |
| 5,452,574 | * 9/1995 | Cowell et al. | 60/39.23 |
| 5,533,329 | 7/1996 | Ohyama . | |
| 5,584,684 | * 12/1996 | Dobbeling et al. | 60/733 |
| 5,640,851 | 6/1997 | Toon . | |
| 5,802,854 | 9/1998 | Maeda . | |
| 5,836,164 | 11/1998 | Tsukahara . | |
| 5,895,211 | * 4/1999 | McMillan | 60/733 |

FOREIGN PATENT DOCUMENTS

| | | |
|---|---|---|
| 0 281 961 | 9/1988 | (EP) . |
| 0 529 900 | 3/1993 | (EP) . |
| 663639 | 12/1951 | (GB) . |
| 1575427 | 9/1980 | (GB) . |
| 9178186 | 5/1996 | (JP) . |
| 8121771 | 7/1997 | (JP) . |

* cited by examiner

*Primary Examiner*—Ted Kim
(74) *Attorney, Agent, or Firm*—W. Warren Taltavull; Manelli, Denison & Selter PLLC (57) ABSTRACT

A combustion chamber assembly (22) comprises a primary, a secondary and a tertiary fuel and air mixing ducts (54,78, 98) to supply fuel and air to primary, secondary and tertiary combustion zones (40,42,44). Each of the primary, secondary and tertiary fuel and air mixing ducts (54,78,98) comprises a pair of axial flow swirlers (56,60,80,84,102,104) arranged coaxially to swirl the air in opposite directions and fuel injectors (62, 86,106) to supply fuel coaxially of the respective axial flow swirlers (56,60,80,84,102, 104). Valves (66,90) are provided to control the supply of air to the primary and the secondary fuel and air mixing ducts (54,78) respectively. A duct (122,116) is arranged to supply cooling air and dilution air to the combustion chamber (22). The amount of air supplied to the primary, secondary and tertiary fuel and air mixing ducts (54,78,98) and the duct (122,116) is measured.

32 Claims, 4 Drawing Sheets

COMBUSTION CHAMBER WITH SEPARATE, VALVED AIR MIXING PASSAGES FOR SEPARATE COMBUSTION ZONES

FIELD OF THE INVENTION

The present invention relates to a combustion chamber assembly, particularly a combustion chamber assembly for a non-aero gas turbine engine.

BACKGROUND OF THE INVENTION

A small gas turbine engine is described in UK patent application no. 9800782.6 filed Jan. 15, 1998 and in a corresponding International patent application no. PCT/GB99/00074 filed Jan. 8, 1999, now abandoned. This gas turbine engine comprises a centrifugal compressor, a diffuser, a heat exchanger, combustion apparatus, and at least one turbine. The compressor has variable inlet guide vanes, the diffuser has variable outlet guide vanes and the at least one turbine has variable inlet guide vanes so that the flow capacity of each component is independently variable while maintaining the temperature, pressure ratio and speed of rotation of the gas turbine engine substantially constant.

A combustion chamber is required for this gas turbine engine which produces low emissions of the oxides of nitrogen (NOx), carbon monoxide (CO) and unburned hydrocarbons (UHC) throughout the entire power range of the gas turbine engine, but especially at low powers.

The fundamental way to reduce the emissions of nitrogen oxides (NOx) is to reduce the combustion reaction temperature, and this requires premixing of the fuel and most of the combustion air before combustion occurs. The oxides of nitrogen (NOx) are commonly reduced by a method which uses two stages of fuel injection. Our UK patent no GB1489339 discloses two stages of fuel injection. Our International patent application no. WO92/07221 discloses two and three stages of fuel injection. In staged combustion, all the stages of combustion seek to provide lean combustion and hence the low combustion temperatures required to minimise NOx. The term lean combustion means combustion of fuel in air where the fuel to air ratio is low, i.e. less than the stoichiometric ratio. In order to achieve the required low emissions of NOx and CO it is essential to mix the fuel and air uniformly.

The industrial gas turbine engine disclosed in our International patent application no. WO92/07221 uses a plurality of tubular combustion chambers, whose axes are arranged in generally radial directions. The inlets of the tubular combustion chambers are at their radially outer ends, and transition ducts connect the outlets of the tubular combustion chambers with a row of nozzle guide vanes to discharge the hot gases axially into the turbine sections of the gas turbine engine. Each of the tubular combustion chambers has two coaxial radial flow swirlers which supply a mixture of fuel and air into a primary combustion zone. An annular secondary fuel and air mixing duct surrounds the primary combustion zone and supplies a mixture of fuel and air into a secondary combustion zone. An annular tertiary fuel and air mixing duct surrounds the secondary combustion zone and supplies a mixture of fuel and air into a tertiary combustion zone.

SUMMARY OF THE INVENTION

Accordingly the present invention seeks to provide a novel combustion chamber assembly for a gas turbine engine which comprises variable inlet guide vanes for the compressor, variable guide vanes for the diffuser, variable inlet guide vanes on the turbine, and in which the combustion chamber assembly produces low emissions at low power levels of the gas turbine engine.

Accordingly the present invention provides a combustion chamber assembly comprising at least one combustion chamber having a primary combustion zone, a secondary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, and means to supply cooling air and dilution air to the combustion chamber.

Preferably the primary fuel and air mixing duct is arranged to supply the fuel and air into the primary combustion zone with a downstream flow component.

Preferably the secondary fuel and air mixing duct is arranged to supply the fuel and air into the primary combustion zone with a tangential and a downstream flow component.

Preferably each primary fuel and air mixing duct comprises a pair of axial flow swirlers arranged coaxially to swirl the air in opposite directions, the primary fuel injector means being arranged to supply fuel coaxially of the axial flow swirlers in the primary fuel and air mixing duct.

Preferably each secondary fuel and air mixing duct comprises a pair of axial flow swirlers arranged coaxially to swirl the air in opposite directions, the secondary fuel injector means being arranged to supply fuel coaxially of the axial flow swirlers in the secondary fuel and air mixing duct.

Preferably the combustion chamber has a tertiary combustion zone, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone.

Preferably the tertiary fuel and air mixing duct is arranged to supply fuel and air into the tertiary combustion zone with a tangential component opposite to the secondary fuel and air mixing duct and a downstream flow component.

Preferably each tertiary fuel and air mixing duct comprises a pair of axial flow swirlers arranged coaxially to swirl the air in opposite directions, the tertiary fuel injector means being arranged to supply fuel coaxially of the axial flow swirlers in the tertiary fuel and air mixing duct.

Preferably there a plurality of primary fuel and air mixing ducts and a plurality of secondary fuel and air mixing ducts.

Preferably there a plurality of primary fuel and air mixing ducts, a plurality of secondary fuel and air mixing ducts and a plurality of tertiary fuel and air mixing ducts.

Preferably the primary fuel and air mixing duct is arranged to inject fuel and air into the combustion chamber with a tangential and a downstream flow component.

The first and second valve means may be two position valves, alternatively the first and second valve means may be multi-position valves.

Preferably one of the axial flow swirlers in the primary fuel and air mixing duct provides more swirl than the other axial flow swirler such that there is a residual swirl provided by the pair of axial flow swirlers.

Preferably the axial flow swirlers in the secondary fuel and air mixing duct provide substantially equal and opposite swirl such that there is no residual swirl provided by the pair of axial flow swirlers.

Preferably the axial flow swirlers in the tertiary fuel and air mixing duct provide substantially equal and opposite swirl such that there is no residual swirl provided by the pair of axial flow swirlers.

Preferably there are means to measure the flow of air to the primary and secondary fuel and air mixing ducts, and means to control the supply of fuel to the primary and secondary fuel injector means in response to the measured flows of air to the primary and secondary fuel and air mixing ducts to minimise emissions from the combustion chamber.

Preferably there are means to measure the flow of air to the primary, secondary and tertiary fuel and air mixing ducts, and means to control the supply of fuel to the primary, secondary and tertiary fuel injector means in response to the measured flows of air to the primary, secondary and tertiary fuel and air mixing ducts to minimise emissions from the combustion chamber.

Preferably the means to measure the air flow to the primary, secondary and tertiary fuel and air mixing ducts comprises low pressure Corioli meters.

Preferably there are means to measure the cooling air flow and dilution air flow to the combustion chamber. Preferably the means to measure the cooling air flow and dilution air flow to the combustion chamber comprises a low pressure Corioli meter.

The present invention also provides a combustion chamber assembly comprising a combustion chamber having a primary combustion zone, a secondary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, means to supply cooling air and dilution air to the combustion chamber, means to measure the flow of air to the primary and secondary fuel and air mixing ducts, and means to control the supply of fuel to the primary and secondary fuel injector means in response to the measured flows of air to the primary and secondary fuel and air mixing ducts to minimise emissions from the combustion chamber.

Preferably the combustion chamber has a tertiary combustion zone, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone, means to measure the flow of air to the tertiary fuel and air mixing duct and means to control the supply of fuel to the primary, secondary and tertiary fuel injector means in response to the measured flows of air to the primary, secondary and tertiary fuel and air mixing ducts to minimise emissions from the combustion chamber.

Preferably the means to measure the air flow to the primary and secondary fuel and air mixing ducts comprises low pressure Corioli meters.

Preferably the means to measure the air flow to the primary, secondary and tertiary fuel and air mixing ducts comprises low pressure Corioli meters.

Preferably there are means to measure the cooling air flow and dilution air flow to the combustion chamber.

Preferably the means to measure the cooling air flow and dilution air flow to the combustion chamber comprises a low pressure Corioli meter.

Preferably each primary fuel and air mixing duct comprises a pair of axial flow swirlers arranged coaxially to swirl the air in opposite directions, primary fuel injector means to supply fuel coaxially of the axial flow swirlers in the primary fuel and air mixing duct.

Preferably each secondary fuel and air mixing duct comprises a pair of axial flow swirlers arranged coaxially to swirl the air in opposite directions, secondary fuel injector means to supply fuel coaxially of the axial flow swirlers in the secondary fuel and air mixing duct.

Preferably each tertiary fuel and air mixing duct comprises a pair of axial flow swirlers arranged coaxially to swirl the air in opposite directions, tertiary fuel injector means to supply fuel coaxially of the axial flow swirlers in the tertiary fuel and air mixing duct.

Preferably the tertiary fuel and air mixing duct is arranged to inject fuel and air into the combustion chamber with a tangential component opposite to the secondary fuel and air mixing duct and a downstream flow component.

The present invention also provides a method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone, and means to supply cooling air and dilution air to the combustion chamber, the method comprising closing the first valve means and the second valve means in a first mode of operation, opening the first valve means and maintaining the second valve means closed in a second mode of operation and opening the first valve means and the second valve means in a third mode of operation.

Preferably in the closed position the first valve means reduces the air flow to the primary fuel and air mixing duct by 50% compared to the open position of the first valve means.

Preferably in the closed position the second valve means reduces the air flow to the secondary fuel and air mixing duct by about 50% compared to the open position of the second valve means.

Preferably the method comprises supplying about 5% of the total air flow to the primary fuel and air mixing duct, supplying about 5% of the total air flow to the secondary fuel and air mixing duct, supplying about 10% of the total air flow to the tertiary fuel and air mixing duct and supplying the remainder of the air as dilution and cooling air to the combustion chamber in the first mode of operation.

Preferably the method comprises supplying about 10% of the total air flow to the primary fuel and air mixing duct, supplying about 5% of the total air flow to the secondary fuel and air mixing duct, supplying about 10% of the total air flow to the tertiary fuel and air mixing duct and supplying the remainder of the air as dilution and cooling air to the combustion chamber in the second mode of operation.

Preferably the method comprises supplying about 10% of the total air flow to the primary fuel and air mixing duct, supplying about 10% of the total air flow to the secondary fuel and air mixing duct, supplying about 10% of the total air flow to the tertiary fuel and air mixing duct and supplying the remainder of the air as dilution and cooling air to the combustion chamber in the third mode of operation.

Preferably the method comprises measuring the flow rate of air supplied to the primary fuel and air mixing duct, measuring the flow rate of air supplied to the secondary fuel and air mixing duct, measuring the flow rate of air supplied to the tertiary fuel and air mixing duct, adjusting the flow rate of fuel to the primary fuel injector to maintain a first predetermined fuel to air ratio in the primary fuel and air mixing duct, adjusting the flow rate of fuel to the secondary fuel injector to maintain a second predetermined fuel to air ratio in the secondary fuel and air mixing duct, and adjusting the flow rate of fuel to the tertiary fuel injector to maintain a third predetermined fuel to air ratio in the tertiary fuel and air mixing duct.

BRIEF DESCRIPTION OF THE DRAWINGS

Preferably the secondary combustion zone is arranged downstream of the primary combustion zone. Preferably the tertiary combustion zone is arranged downstream of the secondary combustion zone.

The present invention will be more fully described by way of example with reference to the accompanying drawings in which.

DETAILED DESCRIPTION OF THE INVENTION

A gas turbine engine 10 having a combustion chamber according to the present invention is particularly suitable for marine and automotive applications which operate largely at low power. For example an automotive gas turbine engine may utilise 6% of the available power at speeds of approximately 30 mph, 18% of the available power at speeds of approximately 56 mph, 35% of the available power at speeds of approximately 75 mph for a vehicle with a maximum speed of 115 mph.

Figure 1:
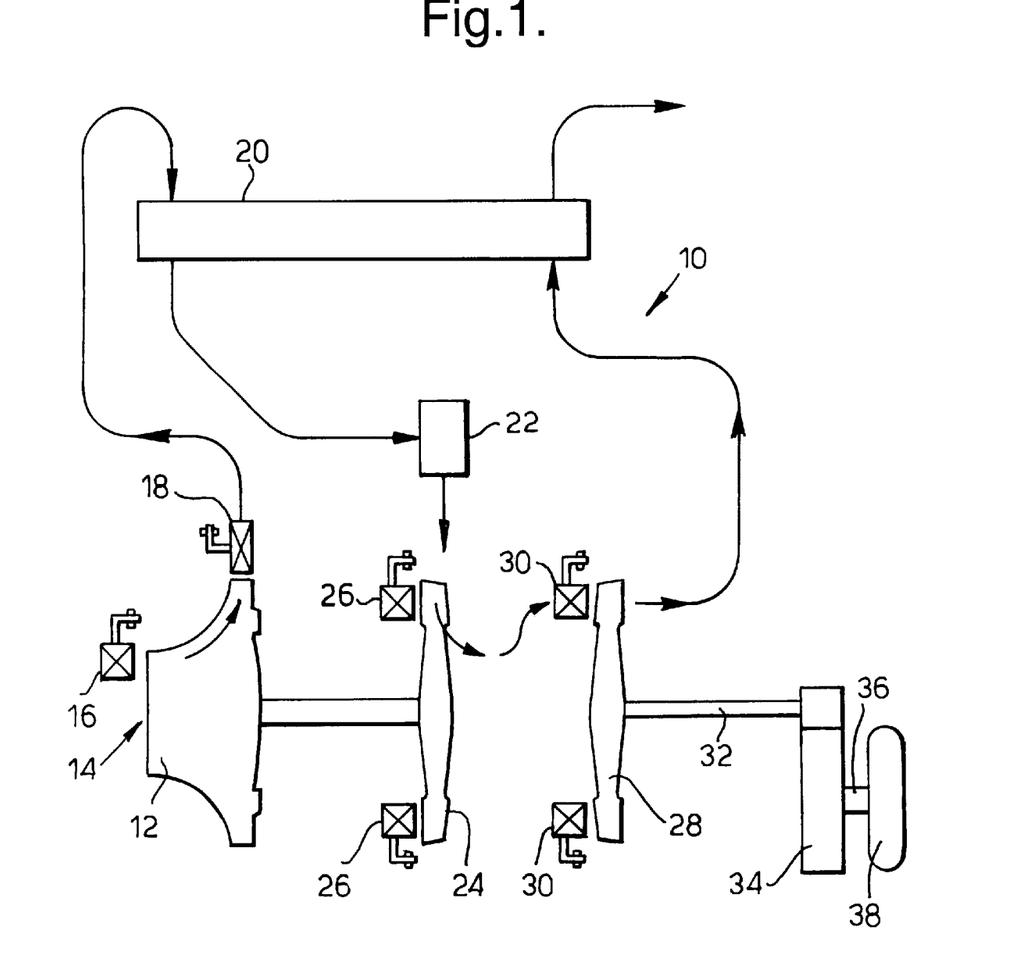
FIG. 1 shows a gas turbine engine having a combustion chamber assembly according to the present invention.

The gas turbine engine 10 shown in FIG. 1 is a preferred arrangement for a gas turbine engine having a combustion chamber according to the present invention. The gas turbine engine 10 comprises a first centrifugal air compressor 12 comprising a radial inlet duct 14 incorporating variable inlet guide vanes 16 and a centrifugal impeller (not shown). The centrifugal compressor 12 delivers air via a variable area radial diffuser 18 to a heat exchanger 20. The variable area radial diffuser 18 reduces the velocity of the air before it enters the heat exchanger 20.

The variable area inlet guide vanes 16 comprise an aerofoil cross section. These inlet guide vanes are fully open when full power is required thus allowing the air to reach the impeller without substantial swirl and even a small amount of anti-rotative swirl to ensure the maximum amount of flow is passed. When the power demand is reduced the variable area inlet guide vanes 16 are positioned in a semi-closed state. This causes rotative swirl of the working fluid reaching the impeller inlet, which reduces the relative velocity, because the rotative swirl velocity is effectively subtracted from the rotational speed vector. Thus the mass flow of the working fluid at any given speed is reduced. The centrifugal impeller produces an increase in static pressure and absolute velocity. The working fluid leaves the impeller at approximately Mach 1.

The working fluid passes into a variable area radial diffuser 18 which contributes to the compressor pressure rise by recovering velocity as static pressure. The diffuser vanes are pivoted so as to move in a tangential direction with respect to the diffuser and adjust the throat area. As these vanes are closed simultaneously with the variable inlet guide vanes, the leading edge incidence is optimised. In addition the degree of diffusion up to the throat is controlled. Too high an incidence or attempted diffusion would also result in surge. Surge is where the adverse flow conditions cause a high local pressure loss resulting in flow reversal as the pressure rise cannot be sustained.

This working fluid is then passed through the heat exchanger 20, then into the combustion chamber 22 and then to a first turbine 24. The working fluid is preheated in the heat exchanger 20. Fuel is burned in the combustion chamber 22 and the resulting combustion products flow into the first turbine 24 which is drivingly connected to the centrifugal compressor 12.

The first turbine 24 incorporates a variable area nozzle 26 which is operated so as to close the vanes as power demand falls thus reducing flow capacity. The turbine design expansion ratio is chosen high enough to ensure choked operation over most of the power range, thus ensuring flow capacity remains proportional to nozzle throat area. If unchoked, the flow capacity would be set by the expansion ratio and rotor throat area, and sufficient variation could not be achieved via the nozzle area.

The exhaust gases from this first turbine 24 are then directed into a free power turbine 28. The power turbine 28 also comprises variable area nozzles 30. The power turbine 28 is connected to a power shaft 32 which is in turn connected through a gear unit 34 to an output shaft 36 coupled to any suitable load device (not shown), for example, the driving wheels 38 of a motor vehicle or a propeller of a marine vessel or an electric generator. The hot exhaust gases from the power turbine 28 are directed back into the heat exchanger 20 to directly pre-heat the air from the diffuser 18 before it enters the combustion chamber 22.

The combustion chamber 22, as shown more clearly in FIGS. 2 to 5, is a staged combustor incorporating a primary combustion zone 40, a secondary combustion zone 42 and a tertiary combustion zone 44 arranged in flow series and a dilution section 46 downstream of the tertiary combustion zone 44. All three combustion zones 40, 42 and 44 are provided with premixed fuel and air, the downstream, tertiary, combustion zone 44 including opposite swirl to that of the intermediate, secondary, combustion zone 42 to increase mixing and minimise swirl upstream of the dilution section 46.

Figure 2:
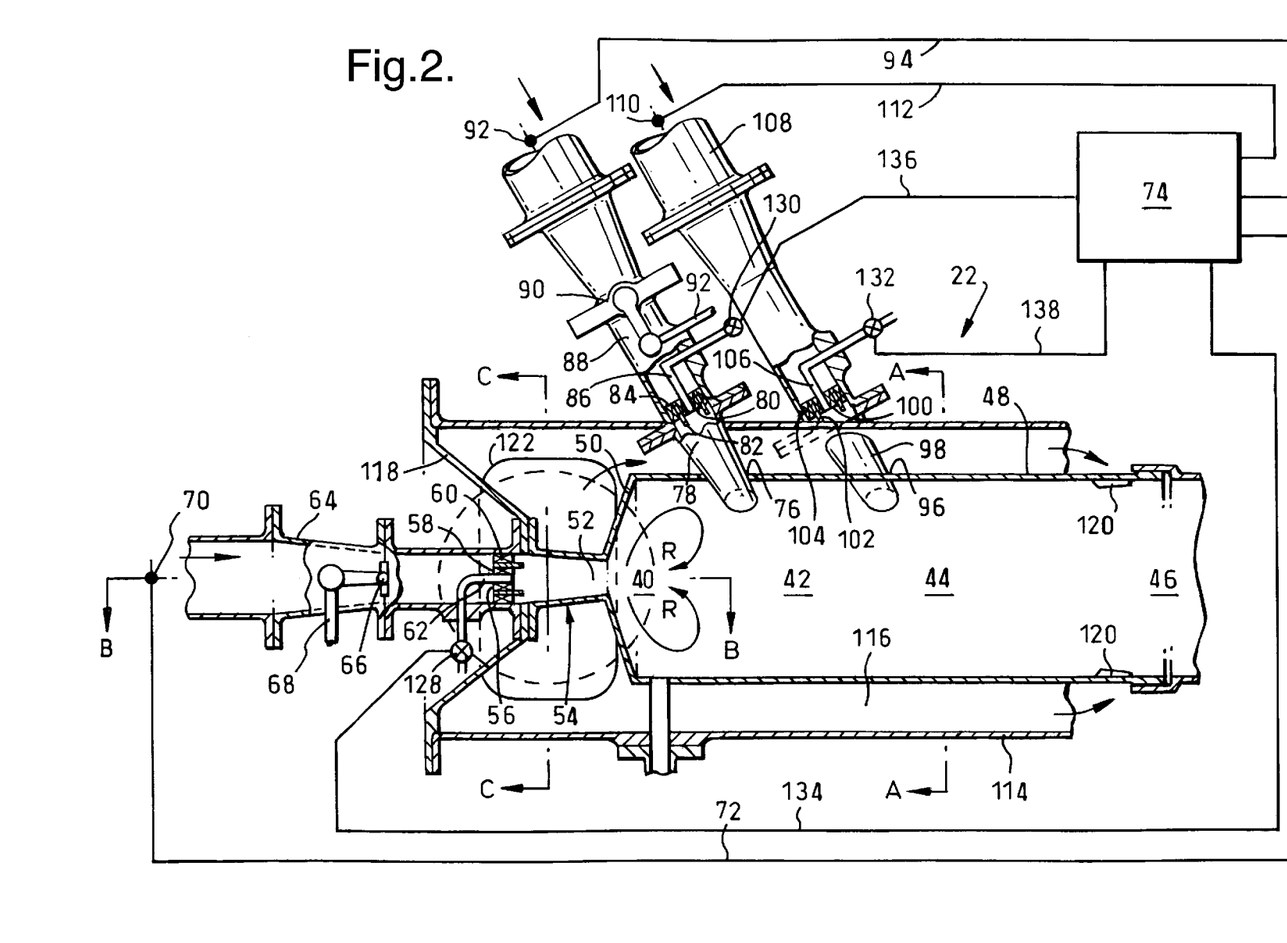
FIG. 2 is a longitudinal cross-sectional view through the combustion chamber assembly according to the present invention.

It has been found that the overall level of pressure loss in a fixed geometry combustion chamber would change excessively due to changes in mass flow levels when the variable inlet guide vanes, variable area radial diffuser and variable area nozzles change their mass flow levels. Therefore the combustion chamber 22 is provided with features to vary the mass flow.

The combustion chamber 22 is a tubular combustion chamber and comprises an inner cylindrical wall 48 which defines the primary, secondary and tertiary combustion zones 40, 42 and 44 and the dilution section 46. The upstream end of the cylindrical wall 48 has a conical head 50 which is provided with an aperture 52 coaxially with the axis of the cylindrical wall 48.

A primary fuel for a and air mixing duct 54 is arranged to supplying a mixture of fuel and air into the primary combustion zone 40 through the aperture 52 in the head 50 of the combustion chamber 22. The primary fuel and air mixing duct 54 is arranged coaxially with the axis of the cylindrical wall 46 of the combustion chamber 22 but may be arranged tangentially. The primary fuel and air mixing duct 54 comprises a first, radially inner, axial flow swirler 56, an annular member 58 surrounding and extending downstream from the first axial flow swirler 56 and a second, radially outer, axial flow swirler 60 surrounding the annular member 58. One of the axial flow swirlers 56, 60 is arranged to provide more swirl than the other of the axial flow swirlers 60, 56 such that there is residual swirl at the entry into the primary combustion zone 40 of the combustion chamber 22. The residual swirl enhances the primary flow reversal R to sustain the combustion process. A primary fuel injector nozzle 62 is arranged coaxially within the first axial flow swirler 56, to supplying fuel into the primary fuel and air mixing duct 54. The primary fuel injector 62 is a simplex fuel injector and is arranged to spray fuel onto the annular member 58, and the fuel is atomized and mixed with the air abide the opposite please swirling flows of air from the axial flow swirlers 56 and 60. The primary combustion zone 40 is arranged to be long enough to reduce carbon monoxide emissions and/or the external convection cooling reduces the quenching effect. Any carbon monoxide generated in the primary combustion zone 40 is consumed in the secondary combustion zone 42.

A first air duct 64 supplies heated air from the heat exchanger 20 to the primary fuel and air mixing duct 54. The first air duct 64 comprises a first valve 66 which is adjustable to vary the amount of air supplied to the primary fuel and air mixing duct 54. The first valve 66 is adjusted by an actuator 68. The first valve 66 is a two position butterfly valve, but it may be any other suitable two position valve or a multi position valve. The first air duct 64 also comprises an air flow measuring device 70, for example a low loss Corioli meter, a venturi meter or other low pressure loss velocity measuring device to accurately measure the air flow to the primary fuel and air mixing duct 54. The flow measuring device 70 sends a signal corresponding to the amount of air flowing to the primary fuel and air mixing duct 54 via electrical connector 72 to a processor 74.

Figure 3:
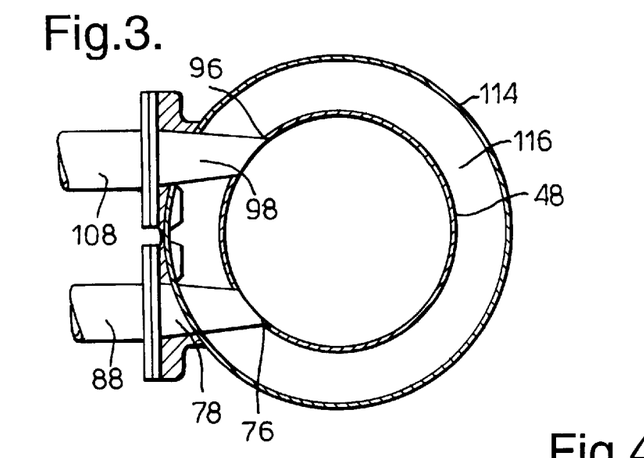
FIG. 3 is a cross-sectional view in the direction of arrows A—A in FIG. 2.

A secondary fuel and air mixing duct 78 is arranged to supply a mixture of fuel and air into the secondary combustion zone 42 through an aperture 76 in the cylindrical wall 48 of the combustion chamber 22. The secondary fuel and air mixing duct 78 is arranged tangentially with the axis of the cylindrical wall 46 of the combustion chamber 22. The secondary fuel and air mixing duct 78 is arranged to direct the fuel and air mixture in a tangential direction and also with a downstream component to minimise interference with the primary combustion zone 40. The secondary fuel and air mixing duct 78 comprises a third, radially inner, axial flow swirler 80, an annular member 82 surrounding and extending downstream from the third axial flow swirler 80 and a fourth, radially outer, axial flow swirler 84 surrounding the annular member 82. The axial flow swirlers 80, 84 are arranged to provide substantially equal swirl or low residual swirl. A secondary fuel injector nozzle 86 is arranged coaxially within the third axial flow swirler 80, to supply fuel into the secondary fuel and air mixing duct 78. The secondary fuel injector 86 is a simplex fuel injector and is arranged to spray fuel onto the annular member 82, and the fuel is atomised and mixed with the air by the oppositely swirling flows of air from the axial flow swirlers 80 and 84. The low residual swirl prevents flow recirculation and hence combustion takes place in the secondary combustion zone 42 remote from the wall 48 of the combustion chamber 22 and this ensures low emissions of carbon monoxide (CO). If there was a residual swirl and hence a flow recirculation film cooling air would be entrained causing high carbon monoxide emissions.

A second air duct 88 supplies heated air from the heat exchanger 20 to the secondary fuel and air mixing duct 78. The second air duct 88 comprises a second valve 90 which is adjustable to vary the amount of air supplied to the secondary fuel and air mixing duct 78. The second valve 90 is adjusted by an actuator 92. The second valve 90 is a two position butterfly valve, but it may be any other suitable two position valve or a multi position valve. The second air duct 88 also comprises an air flow measuring device 92, for example a low loss Corioli meter, a venturi meter or other low pressure loss velocity measuring device to accurately measure the air flow to the secondary fuel and air mixing duct 78. The flow measuring device 92 sends a signal corresponding to the amount of air flowing to the secondary fuel and air mixing duct 78 via electrical connector 94 to the processor 74.

Figures 4, 5:
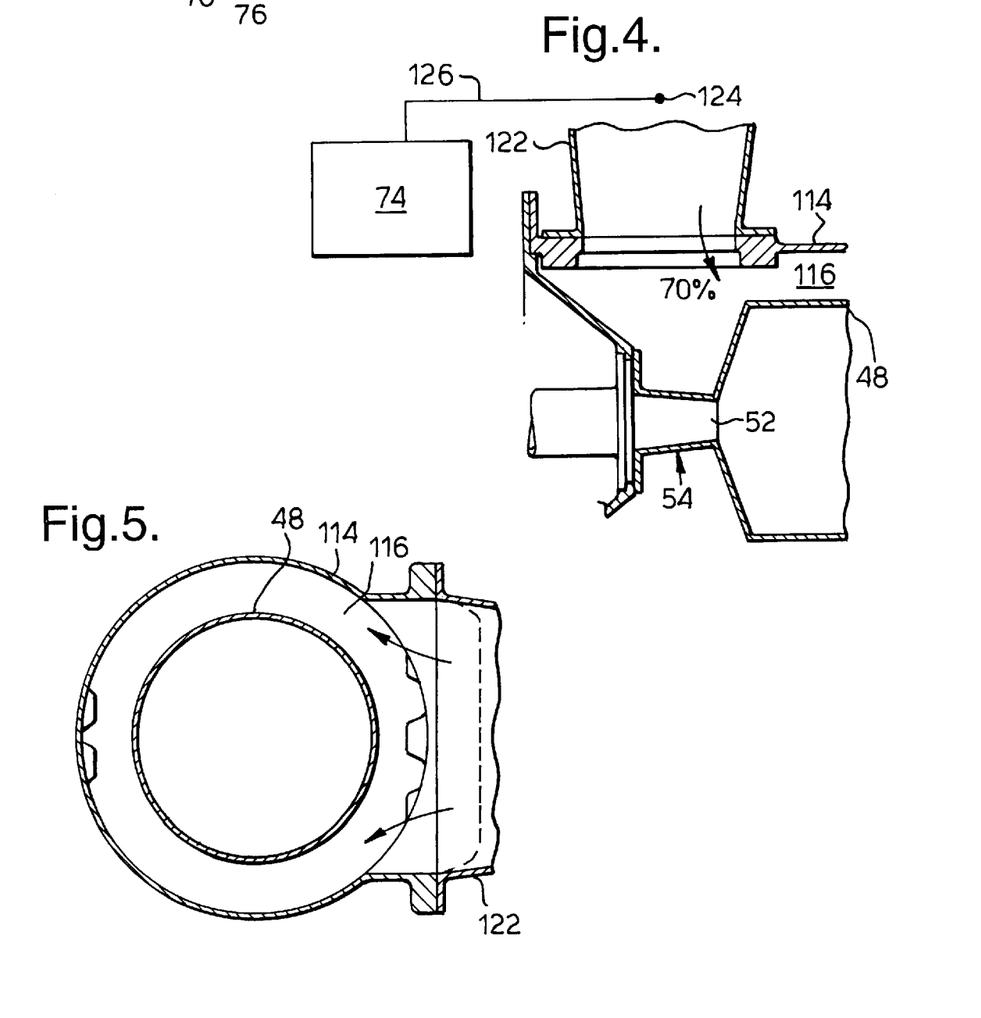
FIG. 4 is a cross-sectional view in the direction of arrows B—B in FIG. 2.
FIG. 5 is a cross-sectional view in the direction of arrows C—C in FIG. 2.

A tertiary fuel and air mixing duct 98 is arranged to supply a mixture of fuel and air into the tertiary combustion zone 44 through an aperture 96 in the cylindrical wall 48 of the combustion chamber 22. The tertiary fuel and air mixing duct 98 is arranged tangentially with the axis of the cylindrical wall 46 of the combustion chamber 22. The tertiary fuel and air mixing duct 98 is arranged to direct the fuel and air mixture in the opposite tangential direction to the secondary fuel and air mixing duct 78 and also with a downstream component to minimise interference with the secondary combustion zone 42. The tertiary fuel and air mixing duct 98 comprises a fifth, radially inner, axial flow swirler 100, an annular member 102 surrounding and extending downstream from the fifth axial flow swirler 100 and a sixth, radially outer, axial flow swirler 104 surrounding the annular member 102. The axial flow swirlers 100, 104 are arranged to provide substantially equal swirl or low residual swirl. A tertiary fuel injector nozzle 106 is arranged coaxially within the fifth axial flow swirler 100, to supply fuel into the tertiary fuel and air mixing duct 98. The tertiary fuel injector 106 is a simplex fuel injector and is arranged to spray fuel onto the annular member 102, and the fuel is atomised and mixed with the air by the oppositely swirling flows of air from the axial flow swirlers 100 and 104.

A third air duct 108 supplies heated air from the heat exchanger 20 to the tertiary fuel and air mixing duct 98. The third air duct 108 does not comprise a valve. The third air duct 108 comprises an air flow measuring device 110, for example a low loss Corioli meter, a venturi meter or other low pressure loss velocity measuring device to accurately measure the air flow to the tertiary fuel and air mixing duct 108. The flow measuring device 110 sends a signal corresponding to the amount of air flowing to the secondary fuel and air mixing duct 108 via electrical connector 112 to the processor 74.

The combustion chamber 22 also comprises an outer cylindrical wall 114 spaced radially from the inner cylindrical wall 48 to define an annular passage 116 and the upstream end of the cylindrical wall 114 has a conical head 118 to close the annular passage 116 at its upstream end. The annular passage 116 is arranged to supply cooling air and dilution air around the inner cylindrical wall 48. The cylindrical wall 48 is cooled by the flow of air through the annular passage 116 and the dilution air flows through apertures 120 in the inner cylindrical wall 48 into the dilution section 46.

A fourth air duct 122 supplies heated air from the heat exchanger 20 to the annular passage 116. The fourth air duct 122 does not comprise a valve. The fourth air duct 122 comprises an air flow measuring device 124, for example a low loss Corioli meter, a venturi meter or other low pressure loss velocity measuring device to accurately measure the air flow to the annular passage 116. The flow measuring device 124 sends a signal corresponding to the amount of air flowing to the annular passage 116 via electrical connector 126 to the processor 74.

The processor 74 analyses the signals from the air flow measuring devices 70, 92, 110 and 124 to determine the amount of air flowing to the primary fuel and air mixing duct 54, the secondary fuel and air mixing duct 78, the tertiary fuel and air mixing duct 98 and the annular passage 116 respectively. The processor 74 determines and precisely controls the amount of fuel supplied to the primary fuel and air mixing duct 54, the secondary fuel and air mixing duct 78, the tertiary fuel and air mixing duct 98 to ensure the emissions of NOx, carbon monoxide, and unburned hydrocarbons from the combustion chamber 22 are minimised through the full power range of the gas turbine engine 10, particularly at low powers. The processor 74 sends signals to fuel valves 128, 130 and 132, via electrical connectors 134, 136 and 138 respectively, which control the supply of fuel to the primary fuel injector 62, the secondary fuel injector 86 and the tertiary fuel injector 106 respectively.

The secondary combustion zone 42 and tertiary combustion zone 44 are arranged such that they are not self stabilising, rather they are arranged such that the combustion is stabilised by the mixing of the hot gases from the upstream combustion stage.

In operation during starting and at low power up to about 3% power, the first valve 66 and the second valve 90 are closed to limit the air flow to the primary mixing duct 54 and the secondary mixing duct 78 to about 50% of the maximum flow through the primary mixing duct 54 and the secondary mixing duct 78. At power levels between about 3% power and about 6% power the first valve 66 is opened and at power levels above about 6% power the second valve 90 is opened. At power levels up to about 30% power the primary fuel injector 62 and the secondary fuel injector 86 only are supplied with fuel and at power levels above about 30% power the primary fuel injector 62, the secondary fuel injector 86 and the tertiary fuel injector 106 are supplied with fuel.

In one particular arrangement about 5% of the total air flow is supplied to the primary fuel and air mixing duct 54 when the first valve 66 is closed and about 10% of the total air flow is supplied to the primary fuel and air mixing duct 54 when the first valve 66 is open. In this arrangement about 5% of the total air flow is supplied to the secondary fuel and air mixing duct 78 when the second valve 90 is closed and about 10% of the total air flow is supplied to the secondary fuel and air mixing duct 78 when the second valve 90 is open. In this arrangement about 10% of the total air flow is supplied to the tertiary fuel and air mixing duct 98 at all times. In this arrangement about 80% of the total air flow is supplied to the air passage 116 when first and second valves 66 and 90 are closed and about 70% of the total air flow is supplied to the air passage 116 when first and second valves 66 and 90 are open. Approximately 40% of the total air flow is dilution air and is supplied through the dilution apertures 120 into the combustion chamber.

The first and second valves 66 and 90 respectively may be multi-position valves, this may allow the air flow to be redistributed to control, or minimise, noise by varying the air flow, combustion chamber residence time, the point of fuel injection and point of heat release.

The engine provides a part load SFC curve which is comparable with a diesel engine, particularly in the idle to 25% power range. This is achieved by maintaining the cycle parameters (i.e. pressures and temperatures) substantially constant over a large portion of the power range by use of variable vanes. A further effect is to reduce the engine rotational speed variation required for a given power range, which reduces the acceleration time requirement because the angles of the variable vanes are adjustable at a faster rate than the rotational speed of the engine can change.

Figure 6:
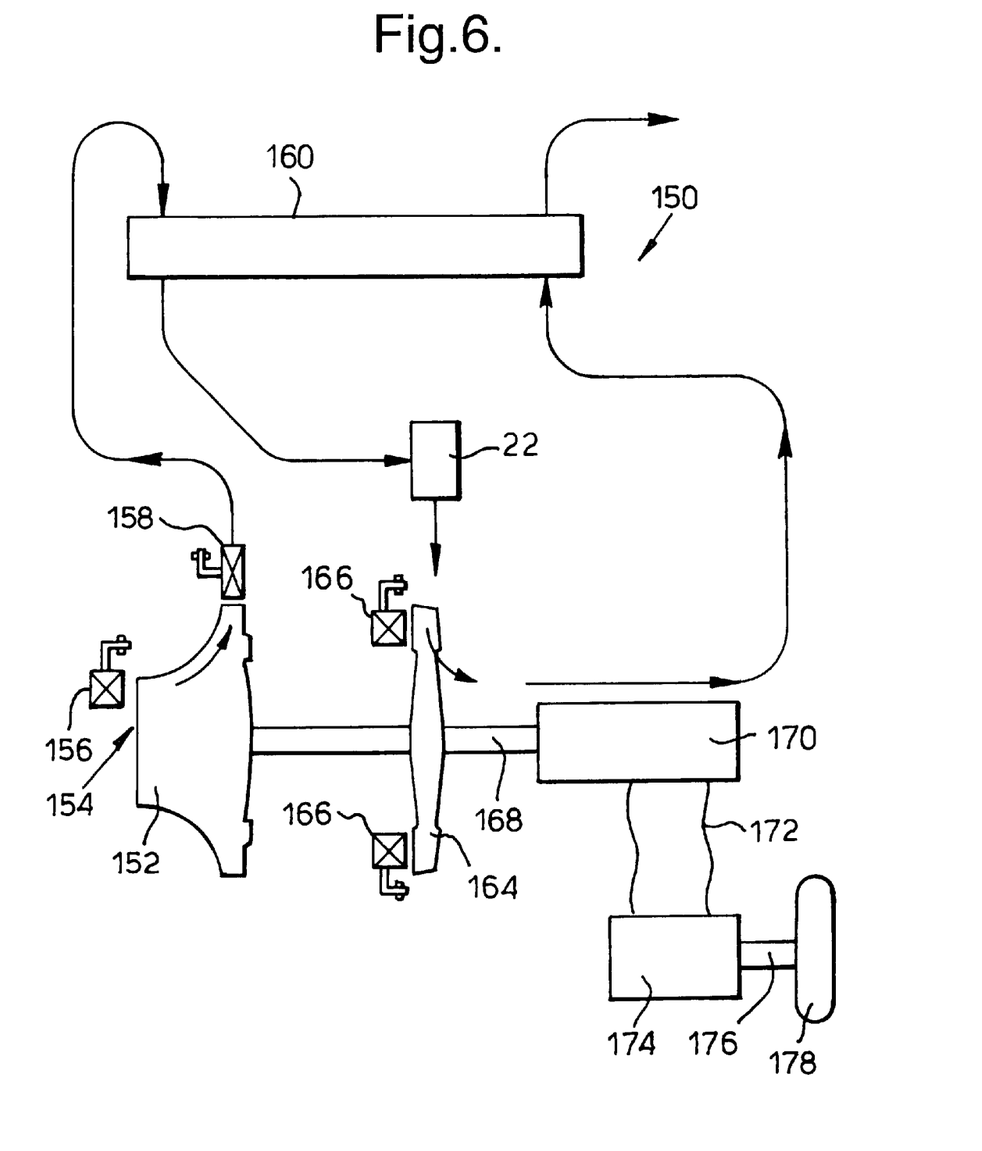
FIG. 6 shows an alternative gas turbine engine having a combustion chamber assembly according to the present invention.

The combustion chamber 22 of the present invention may be used in a gas turbine engine arrangement shown in FIG. 6. The gas turbine engine 150 comprises a first centrifugal air compressor 152 comprising a radial inlet duct 154 incorporating variable inlet guide vanes 156 and a centrifugal impeller (not shown). The centrifugal compressor 152 delivers air via a variable area radial diffuser 158 to a heat exchanger 160. The variable area radial diffuser 158 reduces the velocity of the air before it enters the heat exchanger 160.

The variable area inlet guide vanes 156 comprise an aerofoil cross section. These inlet guide vanes are fully open when full power is required thus allowing the air to reach the impeller without substantial swirl and even a small amount of anti-rotative swirl to ensure the maximum amount of flow is passed. When the power demand is reduced the variable area inlet guide vanes 156 are positioned in a semi-closed state. This causes rotative swirl of the working fluid reaching the impeller inlet, which reduces the relative velocity, because the rotative swirl velocity is effectively subtracted from the rotational speed vector. Thus the mass flow of the working fluid at any given speed is reduced. The centrifugal impeller produces an increase in static pressure and absolute velocity. The working fluid leaves the impeller at approximately Mach 1.

The working fluid passes into a variable area radial diffuser 158 which contributes to the compressor pressure rise by recovering velocity as static pressure. The diffuser vanes are pivoted so as to move in a tangential direction with respect to the diffuser and adjust the throat area. As these vanes are closed simultaneously with the variable inlet guide vanes, the leading edge incidence is optimised. In addition the degree of diffusion up to the throat is controlled. Too high an incidence or attempted diffusion would also result in surge. Surge is where the adverse flow conditions cause a high local pressure loss resulting in flow reversal as the pressure rise cannot be sustained.

This working fluid is then passed through the heat exchanger 160, then into the combustion chamber 22 and then to a turbine 164. Fuel is burned in the combustion chamber 22 and the resulting combustion products flow into the turbine 164 which is drivingly connected to the centrifugal compressor 152.

The turbine 164 incorporates a variable area nozzle 166 which is operated so as to close the vanes as power demand falls thus reducing flow capacity. The turbine design expansion ratio is chosen high enough to ensure choked operation over most of the power range, thus ensuring flow capacity remains proportional to nozzle throat area. If unchoked, the flow capacity would be set by the expansion ratio and rotor throat area, sufficient variation could not be achieved via the nozzle area.

The turbine 164 is also connected to an output shaft 168 which drives an electrical generator 170. The electrical generator 170 is arranged to supply electricity to one or more electrical motors 174 via electrical connections 172, for example, for driving the wheels 178 of a motor vehicle or a propeller of a marine vessel. The hot exhaust gases from the turbine 164 are directed back into the heat exchanger 160 to directly pre-heat the air from the diffuser 158 before it enters the combustion chamber 22.

The combustion chamber 22 is the same as that described previously with reference to FIGS. 2 to 5.

The engine provides a part load SFC curve which is comparable with a diesel engine, particularly in the idle to 25% power range. This is achieved by maintaining the cycle parameters (i.e. pressures and temperatures) substantially constant over a whole power range by use of variable vanes. A further effect is to reduce the engine rotational speed variation required for a given power range, which reduces the acceleration time requirement because the angles of the variable vanes are adjustable at a faster rate than the rotational speed of the engine can change.

The objective of the variable vanes at the inlet to the centrifugal compressor, diffuser, first turbine and power turbine is to allow reduced mass flow whilst maintaining pressure ratio and efficiency. The variable vanes are adjusted to reduce the mass flow for the compressor, diffuser and all the turbines as the power demand falls, or conversely the variable vanes are adjusted to increase mass flow for the compressor, diffuser and all the turbines over a predetermined wide power range. The values of the cycle temperature, speed and pressure ratio are maintained substantially constant over the predetermined wide power range and therefore the specific fuel consumption is maintained substantially constant over this predetermined wide power range.

The variable area inlet guide vanes for the centrifugal compressor enhance the centrifugal compressor's ability to deliver reduced mass flow at constant engine rotational speed.

It is expected that the emission levels of the combustion chamber assembly will be less than 0.5 gm per kw hr.

Although the invention has been described with reference to a gas turbine engine comprising a single combustion chamber assembly comprising a single primary fuel and air mixing duct, a single secondary fuel and air mixing duct and a single tertiary fuel and air mixing duct other combustion chamber assemblies are possible. It may be desirable, if increased power is required from the gas turbine engine, to provide a plurality of combustion chamber assemblies each one of which comprising a single primary fuel and air mixing duct, a single secondary fuel and air mixing duct and a single tertiary fuel and air mixing duct for the respective primary, secondary and tertiary combustion stages. Alternatively it may be desirable, if increased power is required from the gas turbine engine, to provide a single combustion chamber assembly comprising a plurality of primary fuel and air mixing ducts, a plurality of secondary fuel and air mixing ducts and a plurality of tertiary fuel and air mixing ducts for the primary, secondary and tertiary combustion stages.

Alternatively it may be possible to provide one or more combustion chamber, each combustion chamber comprising a plurality of combustion stages, at least two of which have a respective mixing duct with means to vary the air flow into the respective combustion stage. Thus the combustion chamber may comprise two combustion stages with means to vary the air flow into both of the combustion stages, three combustion stages with means to vary the air flow to two or all three of the combustion stages or four combustion stages with means to vary the air flow to two, three or all four of the combustion stages.

The primary fuel and air mixing ducts may be arranged such that they supply the fuel and air into the combustion chamber at axially spaced locations, at different angles to the combustion chamber axis and at different angles in a tangential sense to vary the heat release over the combustion chamber length to reduce, minimise noise. The secondary fuel and air mixing ducts may be arranged such that they supply the fuel and air into the combustion chamber at axially spaced locations, at different angles to the combustion chamber axis and at different angles in a tangential sense to vary the heat release over the combustion chamber length to reduce, minimise noise. The tertiary fuel and air mixing ducts may be arranged such that they supply the fuel and air into the combustion chamber at axially spaced locations, at different angles to the combustion chamber axis and at different angles in a tangential sense to vary the heat release over the combustion chamber length to reduce, minimise noise.

We claim:

1. A combustion chamber assembly comprising at least one combustion chamber having a primary combustion zone, a secondary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct and the secondary fuel and air mixing duct being arranged to supply fuel and air into the secondary combustion zone, said secondary fuel and air mixing duct being arranged to supply the fuel and air into the secondary combustion zone with a tangential and a downstream flow component, said combustion chamber having a tertiary combustion zone, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone, said tertiary fuel and air mixing duct being arranged to supply fuel and air into the tertiary combustion zone with a tangential component opposite to the secondary fuel and air mixing duct and a downstream flow component.

2. A combustion chamber assembly as claimed in claim 1 wherein the primary fuel and air mixing duct is arranged to supply the fuel and air into the primary combustion zone with a downstream flow component.

3. A combustion chamber assembly as claimed in claim 1 wherein each primary fuel and air mixing duct comprises a pair of axial flow swirlers arranged coaxially to swirl the air in opposite directions, the primary fuel injector means being arranged to supply fuel coaxially of the axial flow swirlers in the primary fuel and air mixing duct.

4. A combustion chamber assembly as claimed in claim 3 wherein one of the axial flow swirlers in the primary fuel and air mixing duct providing more swirl than the other axial flow swirler such that there is a residual swirl provided by the pair of axial flow swirlers.

5. A combustion chamber assembly as claimed in claim 1 wherein each secondary fuel and air mixing duct comprises a pair of axial flow swirlers arranged coaxially to swirl the air in opposite directions, the secondary fuel injector means being arranged to supply fuel coaxially of the axial flow swirlers in the secondary fuel and air mixing duct.

6. A combustion chamber assembly as claimed in claim 5 wherein the axial flow swirlers in the secondary fuel and air mixing duct providing substantially equal and opposite swirl such that there is no residual swirl provided by the pair of axial flow swirlers.

7. A combustion chamber assembly as claimed in claim 1 wherein each tertiary fuel and air mixing duct comprises a pair of axial flow swirlers arranged coaxially to swirl the air in opposite directors, the tertiary fuel injector means being arranged to supply fuel coaxially of the axial flow swirlers in the tertiary fuel and air mixing duct.

8. A combustion chamber assembly as claimed in claim 7 wherein the axial flow swirlers in the tertiary fuel and air mixing duct providing substantially equal and opposite swirl such that there is no residual swirl provided by the pair of axial flow swirlers.

9. A combustion chamber assembly as claimed in claim 1 wherein there a plurality of primary fuel and air mixing ducts and a plurality of secondary fuel and air mixing ducts.

10. A combustion chamber as claimed in claim 6 wherein there a plurality of primary fuel and air mixing ducts, a plurality of secondary fuel and air mixing ducts and a plurality of tertiary fuel and air mixing ducts.

11. A combustion chamber assembly as claimed in claim 1 wherein the primary fuel and air mixing duct is arranged to inject fuel and air into the combustion chamber with a tangential and a downstream flow component.

12. A combustion chamber assembly as claimed in claim 1 wherein the first and second valve means are two position valves.

13. A combustion chamber assembly as claimed in claim 1 wherein the first and second valve means are multi-position valves.

14. A combustion chamber assembly as claimed in claim 1 comprising means to measure the flow of air to the primary and secondary fuel and air mixing ducts, and means to control the supply of fuel to the primary and secondary fuel injector means in response to the measured flows of air to the primary and secondary fuel and air mixing ducts to minimise emissions from the combustion chamber.

15. A combustion chamber assembly as claimed in claim 14 comprising means to measure the cooling air flow and dilution air flow to the combustion chamber.

16. A combustion chamber assembly as claimed in claim 15 wherein the means to measure the cooling air flow and dilution air flow to the combustion chamber comprises a low pressure Coriolis meter.

17. A combustion chamber assembly as claimed in claim 1 comprising means to measure the flow of air to the primary, secondary and tertiary fuel and air mixing ducts, and means to control the supply of fuel to the primary, secondary and tertiary fuel injector means in response to the measured flows of air to the primary, secondary and tertiary fuel and air mixing ducts to minimize emissions from the combustion chamber.

18. A combustion chamber assembly as claimed in claim 17 wherein the means to measure the air flow to the primary, secondary and tertiary fuel and air mixing ducts comprises low pressure Coriolis meters.

19. A combustion chamber assembly comprising a combustion chamber having a primary combustion zone, a secondary combustion zone, at least one primary fuel and air mixing duct, primary fuel injector means to supply fuel into the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, means to supply cooling air and dilution air to the combustion chamber, means to measure the flow of air to the primary and secondary fuel and air mixing ducts, and means to control the supply of fuel to the primary and secondary fuel injector means in response to the measured flows of air to the primary and secondary fuel and air mixing ducts to minimize emissions from the combustion chamber, said combustion chamber having a tertiary combustion zone, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone, means to measure the flow of air to the tertiary fuel and air mixing duct and means to control the supply of fuel to the primary, secondary and tertiary fuel injector means in response to the measured flows of air to the primary, secondary and tertiary fuel and air mixing ducts to minimize emissions from the combustion chamber, each tertiary fuel and air mixing duct comprising a pair of axial flow swirlers arranged coaxially to swirl the air in opposite directions, tertiary fuel injector means to supply fuel coaxially of the axial flow swirlers in the tertiary fuel and air mixing duct, said tertiary fuel and air mixing duct being arranged to inject fuel and air into the combustion chamber with a tangential component opposite to the secondary fuel and air mixing duct and a downstream flow component.

20. A combustion chamber assembly as claimed in claim 19 wherein the means to measure the air flow to the primary and secondary fuel and air mixing ducts comprises low pressure Corioli meters.

21. A combustion chamber assembly as claimed in claim 19 wherein the means to measure the air flow to the primary, secondary and tertiary fuel and air mixing ducts comprises low-pressure Corioli meters.

22. A combustion chamber assembly as claimed in claim 19 comprising means to measure the cooling air flow and dilution air flow to the combustion chamber.

23. A combustion chamber assembly as claimed in claim 22 wherein the means to measure the cooling air flow and dilution air flow to the combustion chamber comprises a low pressure Corioli meter.

24. A combustion chamber assembly as claimed in claim 19 wherein each primary fuel and air mixing duct comprises a pair of axial flow swirlers arranged coaxially to swirl the air in opposite directions, primary fuel injector means to supply fuel coaxially of the axial flow swirlers in the primary fuel and air mixing duct.

25. A combustion chamber assembly as claimed in claim 19 wherein each secondary fuel and air mixing duct comprises a pair of axial flow swirlers arranged coaxially to swirl the air in opposite directions, secondary fuel injector means to supply fuel coaxially of the axial flow swirlers in the secondary fuel and air mixing duct.

26. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, the method comprising closing the first valve means and second valve means in a first mode of operation, opening the first valve means and maintaining the second valve means closed in a second mode of operation and opening the first valve means and the second valve means in a third mode of operation, at least one tertiary fuel and air mixing duct, tertiary fuel injector means to supply fuel to the tertiary fuel and air mixing duct, means to supply air to the tertiary fuel and air mixing duct, the tertiary fuel and air mixing duct being arranged to supply fuel and air into the tertiary combustion zone.

27. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, the method comprising closing the first valve means and second valve means in a first mode of operation, opening the first valve means and maintaining the second valve means closed in a second mode of operation and opening the first valve means and the second valve means in a third mode of operation, wherein in the closed position the first valve means reduces the air flow to the primary fuel and air mixing duct by 50% compared to the open position of the first valve means.

28. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, the method comprising closing the first valve means and second valve means in a first mode of operation, opening the first valve means and maintaining the second valve means closed in a second mode of operation and opening the first valve means and the second valve means in a third mode of operation, wherein in the closed position the second valve means reduces the air flow to the secondary fuel and air mixing duct by about 50% compared to the open position of the second valve means.

29. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, a tertiary fuel and air mixing duct and the method comprising closing the first valve means and second valve means in a first mode of operation, opening the first valve means and maintaining the second valve means closed in a second mode of operation and opening the first valve means and the second valve means in a third mode of operation, supplying about 5% of the total air flow to the primary fuel and air mixing duct, supplying about 5% of the total air flow to the secondary fuel and air mixing duct, supplying about 10% of the total air flow to the tertiary fuel and air mixing duct and supplying the remainder of the air as dilution and cooling air to the combustion chamber in the first mode of operation.

30. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, a tertiary fuel and air mixing duct and the method comprising closing the first valve means and second valve means in a first mode of operation, opening the first valve means and maintaining the second valve means closed in a second mode of operation and opening the first valve means and the second valve means in a third mode of operation, supplying about 10% of the total air flow to the primary fuel and air mixing duct, supplying about 5% of the total air flow to the secondary fuel and air mixing duct, supplying about 10% of the total air flow to the tertiary fuel and air mixing duct and supplying the remainder of the air as dilution and cooling air to the combustion chamber in the second mode of operation.

31. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, a tertiary fuel and air mixing duct and the method comprising closing the first valve means and second valve means in a first mode of operation, opening the first valve means and maintaining the second valve means closed in a second mode of operation and opening the first valve means and the second valve means in a third mode of operation, supplying about 10% of the total air flow to the primary fuel and air mixing duct, supplying about 10% of the total air flow to the secondary fuel and air mixing duct, supplying about 10% of the total air flow to the tertiary fuel and air mixing duct and supplying the remainder of the air as dilution and cooling air to the combustion chamber in the third mode of operation.

32. A method of operating a combustion chamber assembly comprising a combustion chamber having a primary combustion zone, a secondary combustion zone and a tertiary combustion zone, at least one primary fuel and air mixing duct, primary fuel injector means to supply fuel to the primary fuel and air mixing duct, first valve means to control the supply of air to the at least one primary fuel and air mixing duct, the primary fuel and air mixing duct being arranged to supply fuel and air into the primary combustion zone, at least one secondary fuel and air mixing duct, secondary fuel injector means to supply fuel to the secondary fuel and air mixing duct, second valve means to control the supply of air to the secondary fuel and air mixing duct, the secondary fuel and air mixing duct being arranged to supply fuel and air into the secondary combustion zone, a tertiary fuel and air mixing duct, a tertiary fuel injector means to supply fuel to the tertiary fuel and air mixing duct and the method comprising closing the first valve means and second valve means in a first mode of operation, opening the first valve means and maintaining the second valve means closed in a second mode of operation and opening the first valve means and the second valve means in a third mode of operation, measuring the flow rate of air supplied to the primary fuel and air mixing duct, measuring the flow rate of air supplied to the secondary fuel and air mixing duct, measuring the flow rate of air supplied to the tertiary fuel and air mixing duct, adjusting the flow rate of fuel to the primary fuel injector means to maintain a first predetermined fuel to air ratio in the primary fuel and air mixing duct, adjusting the flow rate of fuel to the secondary fuel injector means to maintain a second predetermined fuel to air ratio in the secondary fuel and air mixing duct, and adjusting the flow rate of fuel to the tertiary fuel injector means to maintain a third predetermined fuel to air ratio in the tertiary fuel and air mixing duct.

\* \* \* \* \*